(12) United States Patent
Rakshit et al.

(10) Patent No.: US 12,110,199 B2
(45) Date of Patent: Oct. 8, 2024

(54) ON DEMAND CREATION OF MATERIAL MOVEMENT TRACK FOR WAREHOUSE

(71) Applicant: INTERNATIONAL BUSINESS MACHINES CORPORATION, Armonk, NY (US)

(72) Inventors: Sarbajit K. Rakshit, Kolkata (IN); Partho Ghosh, Kolkata (IN); Venkata Vara Prasad Karri, Visakhapatnam (IN); Ramalingeswara Naidu Saragadam, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 17/647,083

(22) Filed: Jan. 5, 2022

(65) Prior Publication Data
US 2023/0211967 A1 Jul. 6, 2023

(51) Int. Cl.
*B65G 67/08* (2006.01)
*B25J 9/16* (2006.01)

(52) U.S. Cl.
CPC ............ *B65G 67/08* (2013.01); *B25J 9/1661* (2013.01); *B25J 9/1664* (2013.01); *B25J 9/1669* (2013.01); *B65G 2207/30* (2013.01)

(58) Field of Classification Search
CPC .... B65G 2207/30; B65G 67/08; B25J 9/1661; B25J 9/1664; B25J 9/1669
See application file for complete search history.

(56) References Cited

U.S. PATENT DOCUMENTS

| 2002/0091483 | A1* | 7/2002 | Douet ................... B61L 23/34 701/408 |
| 2014/0324339 | A1* | 10/2014 | Adam ................... G01S 13/726 701/519 |
| 2016/0271796 | A1 | 9/2016 | Babu |
| 2018/0281191 | A1 | 10/2018 | Sinyavskiy |
| 2021/0223779 | A1* | 7/2021 | Passot ................... G01C 21/20 |

(Continued)

FOREIGN PATENT DOCUMENTS

| CN | 111559606 A | 8/2020 |
| CN | 212502240 U | 2/2021 |
| CN | 113772348 A | 12/2021 |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — James R Bidwell
(74) *Attorney, Agent, or Firm* — Caleb D. Wilkes

(57) ABSTRACT

A method, computer system, and a computer program product for track creation are provided. A computer receives a notification of at least one object to be moved. The at least one object is disposed at a first position. The computer receives a determination of a second position for the at least one object. The computer generates a track plan for a first track for transporting the at least one object from the first position to the second position. The computer transmits a first instruction message to a first robot. The instruction message instructs the first robot to build a track according to the track plan.

20 Claims, 13 Drawing Sheets

(56) References Cited

U.S. PATENT DOCUMENTS

2022/0009102 A1* 1/2022 Czinger .............. B25J 9/1669
2022/0135346 A1* 5/2022 Matsuoka ............ G06Q 10/08
                                                        700/245

FOREIGN PATENT DOCUMENTS

| CN | 113525989 A | 10/2022 |
| EP | 3838803 A1 | 6/2021 |
| JP | 2020107322 A | 7/2020 |
| TW | 202017827 A | 5/2020 |
| WO | 2019047018 A1 | 3/2019 |

OTHER PUBLICATIONS

Taiwan Intellectual Property Office, "Office Action", Jul. 29, 2024, Taiwanese Patent Application No. 112100147, 7 pages (pp. 1-2 English Translation by Machine, pp. 3-7 Original Office Action).

\* cited by examiner

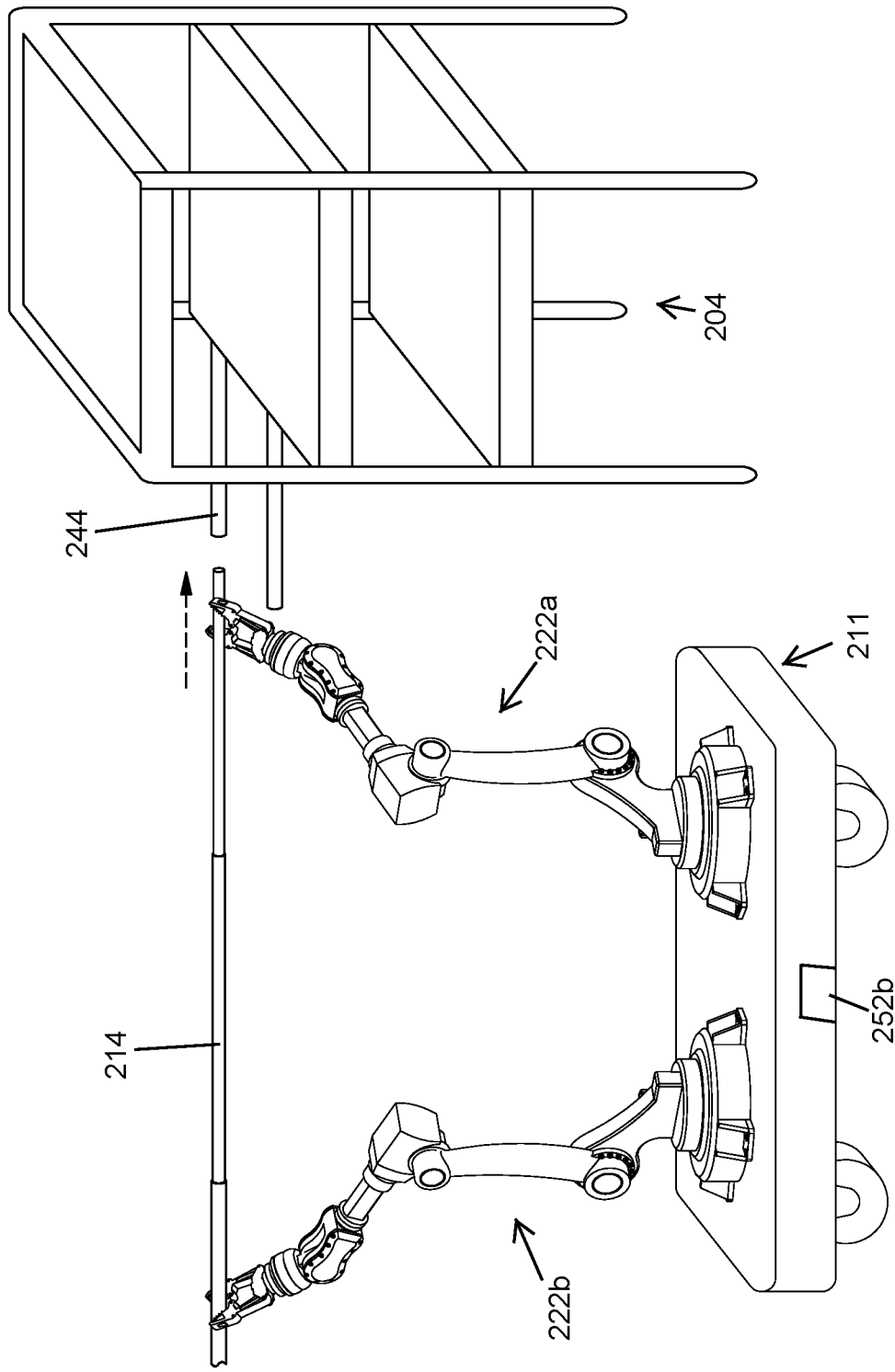

ON DEMAND CREATION OF MATERIAL MOVEMENT TRACK FOR WAREHOUSE

BACKGROUND

The present invention relates generally to a system and method for facilitating the automated moving of goods to be transported, e.g., the automated movement of goods in a warehouse.

SUMMARY

According to one exemplary embodiment, a method for track creation is provided. A computer receives a notification of at least one object to be moved. The at least one object is disposed at a first position. The computer receives a determination of a second position for the at least one object. The computer generates a track plan for a first track for transporting the at least one object from the first position to the second position. The computer transmits a first instruction message to a first robot. The instruction message instructs the first robot to build a track according to the track plan. A computer system, a computer program product, and a track creation system corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2B illustrates a robot vehicle with multiple robot arms extending the telescopic track portion of FIG. 2A for connecting to an existing fixed track in a warehouse according to at least one embodiment;

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, computer program product, and track creation system for creating a reconfigurable material movement track that may be built and reconfigured on demand in an automated manner. Moving packages in a warehouse is a lynchpin of the modern economy. Moving packages from one location associated with the warehouse to another location associated with the warehouse may require significant resource consumption. Demands and the path for this movement of goods within the warehouse are not static and change from time to time based on the contextual situation. Goods may be unloaded into a warehouse from trucks, ships, trains, etc. Goods may be loaded from a warehouse into trucks, ships, trains, etc. to ship the goods. Improvements in the automation of the object moving process will help bolster economical advances. The present embodiments may help improve automation of the object moving process, e.g., within a warehouse, and may help overcome challenges of rigidity and of inflexibility that have arisen with warehouses with permanent material movement tracks. The present embodiments achieve a dynamic installation of a material movement track based on a context of material movement need, e.g., inside a warehouse. The present embodiments facilitate enhanced and systematic material movement whose requirements may change in an ad hoc manner.

Figure 1:
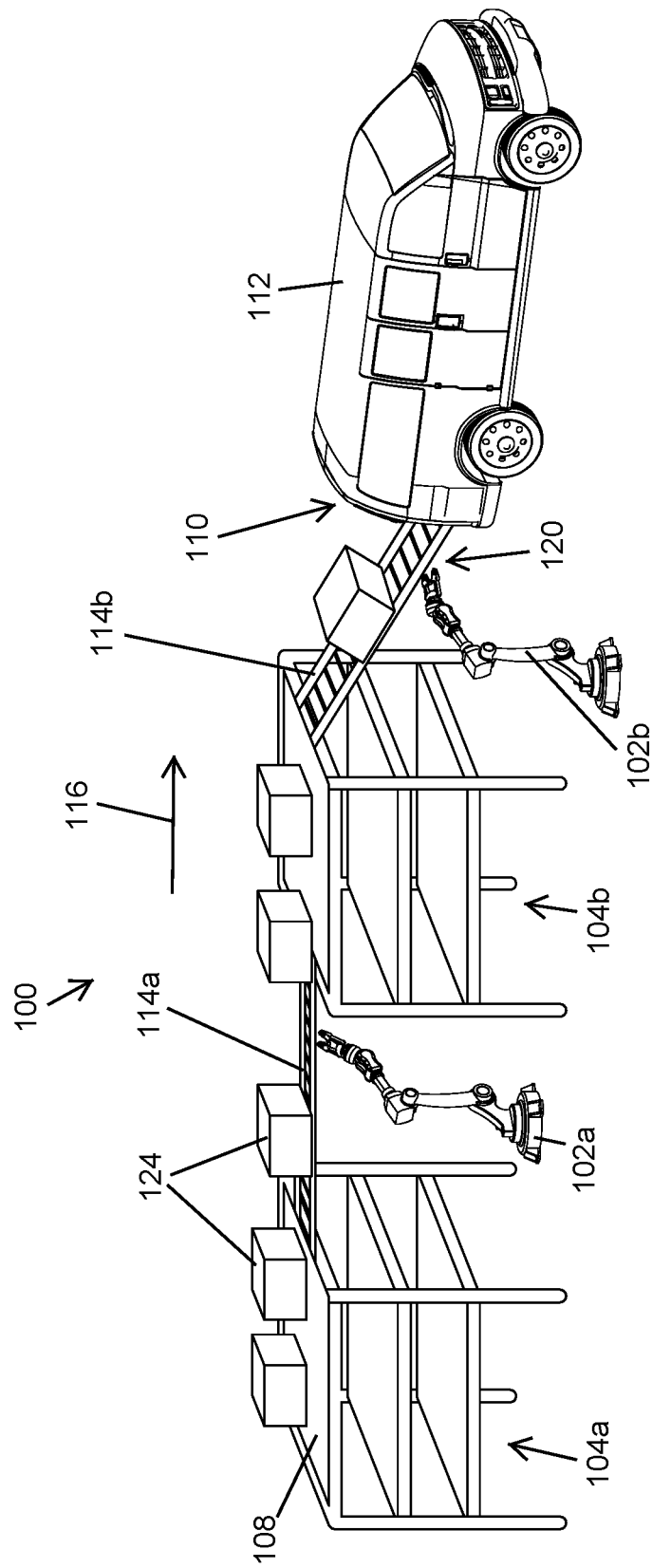
FIG. 1 illustrates an on demand material movement track creation environment according to at least one embodiment.

Referring to FIG. 1, a track creation environment 100 in accordance with an exemplary embodiment is depicted. The track creation environment 100 may include a warehouse with one or more shelves such as a first multi-level shelf 104a and a second multi-level shelf 104b which may hold goods or objects such as the objects 124. These objects 124 may be stored temporarily within the track creation environment 100. At a beginning, middle, or end of their temporary stay in the track creation environment 100, e.g., in the warehouse, there may be a need to move the objects from one location associated with the track creation environment 100 to another location associated with the track creation environment 100. For example, the objects 124 may need to be unloaded from a vehicle 112 and placed onto the shelves such as the first and second multi-level shelves 104a, 104b. The objects 124 may need to be unloaded from shelves such as the first and second multi-level shelves 104a, 104b and loaded onto the vehicle 112. The objects 124 may need to be moved from one location within the track creation environment 100 to another location within the track creation environment 100, e.g., from one shelf to another shelf.

Figure 2A:
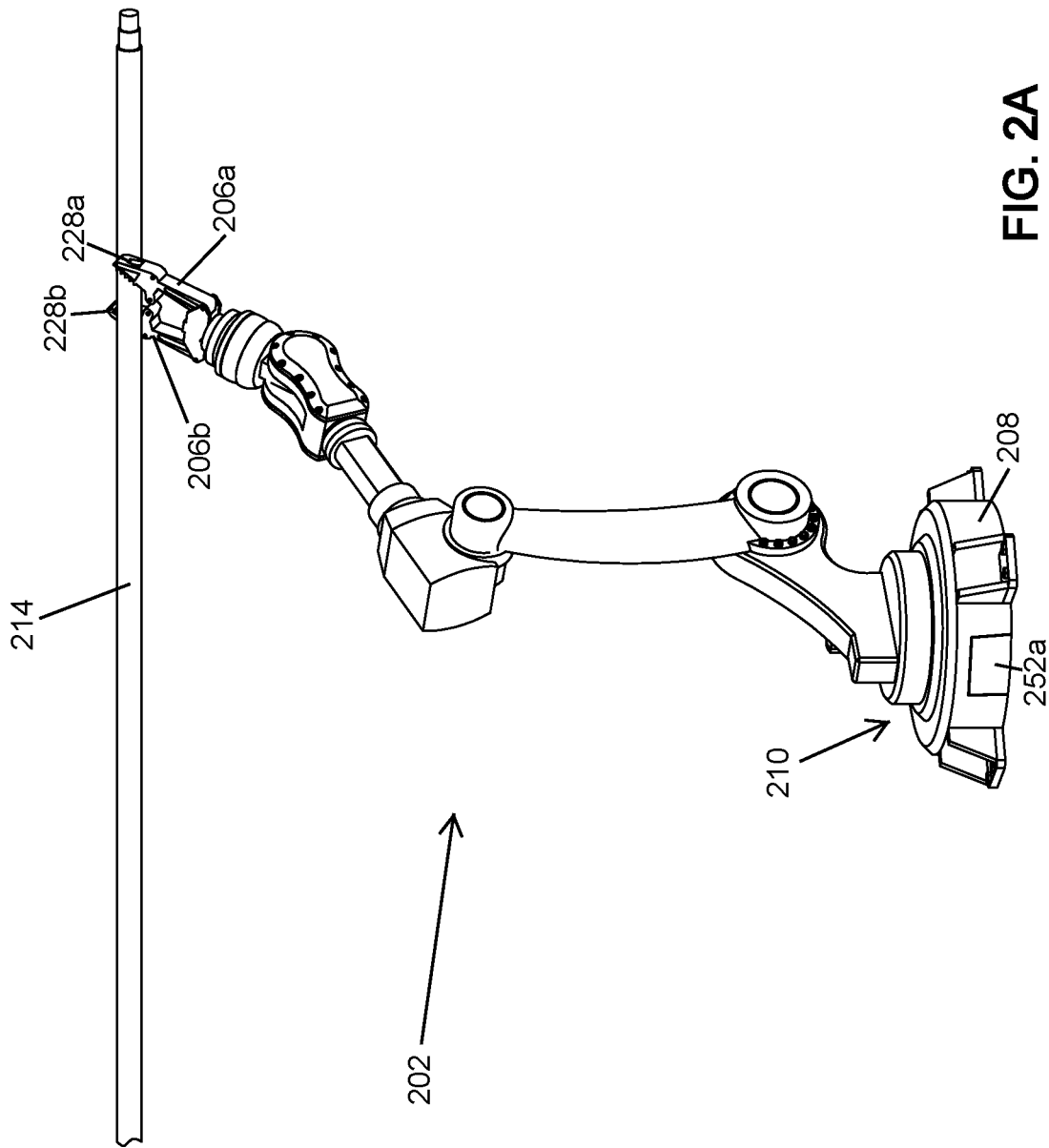
FIG. 2A illustrates a robot carrying a telescopic track portion according to at least one embodiment.
Figure 3A:
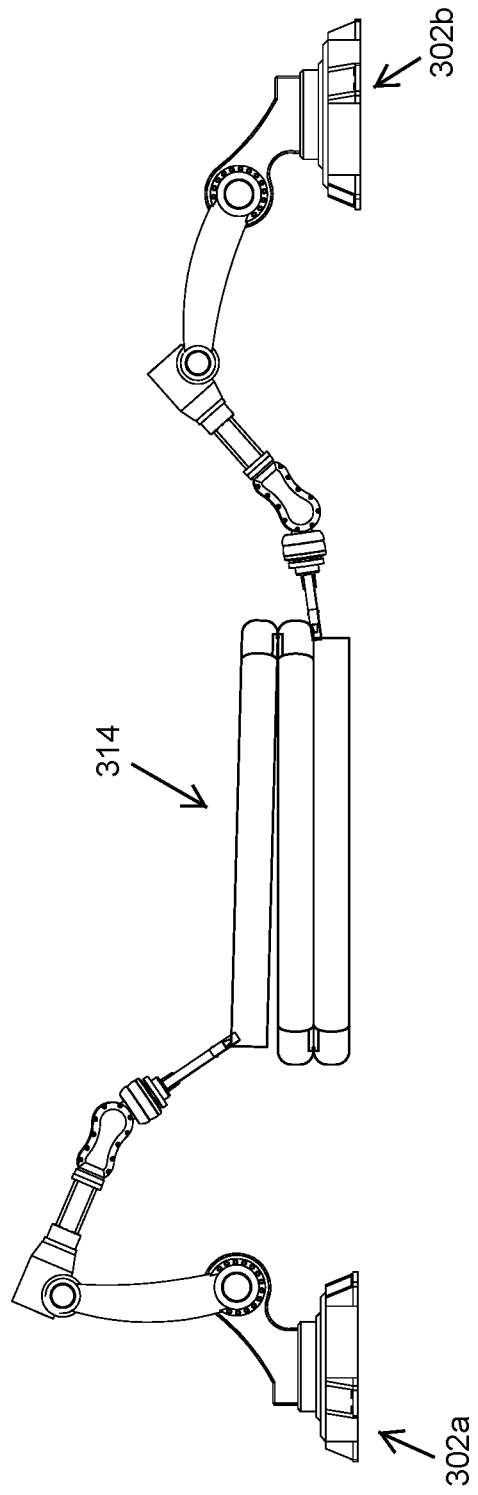
FIG. 3A illustrates other robots grasping a foldable material movement track segment that is in a folded position according to at least one embodiment.
Figure 3B:
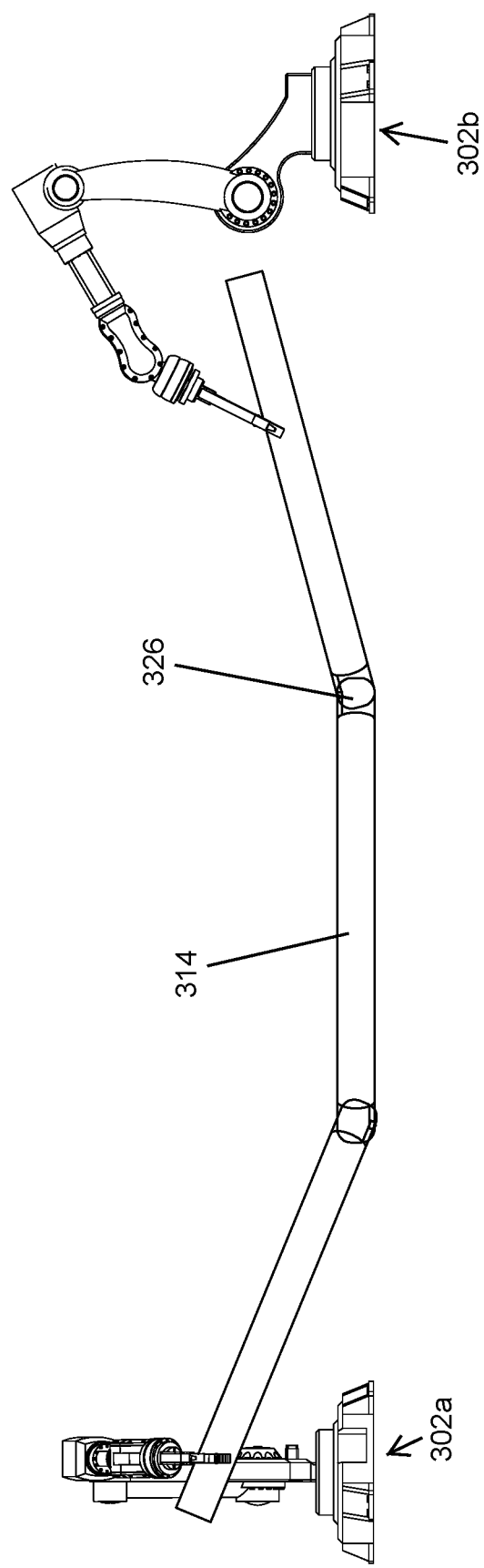
FIG. 3B illustrates the robots of FIG. 3A having unfolded the foldable material movement track according to at least one embodiment.
Figure 5:
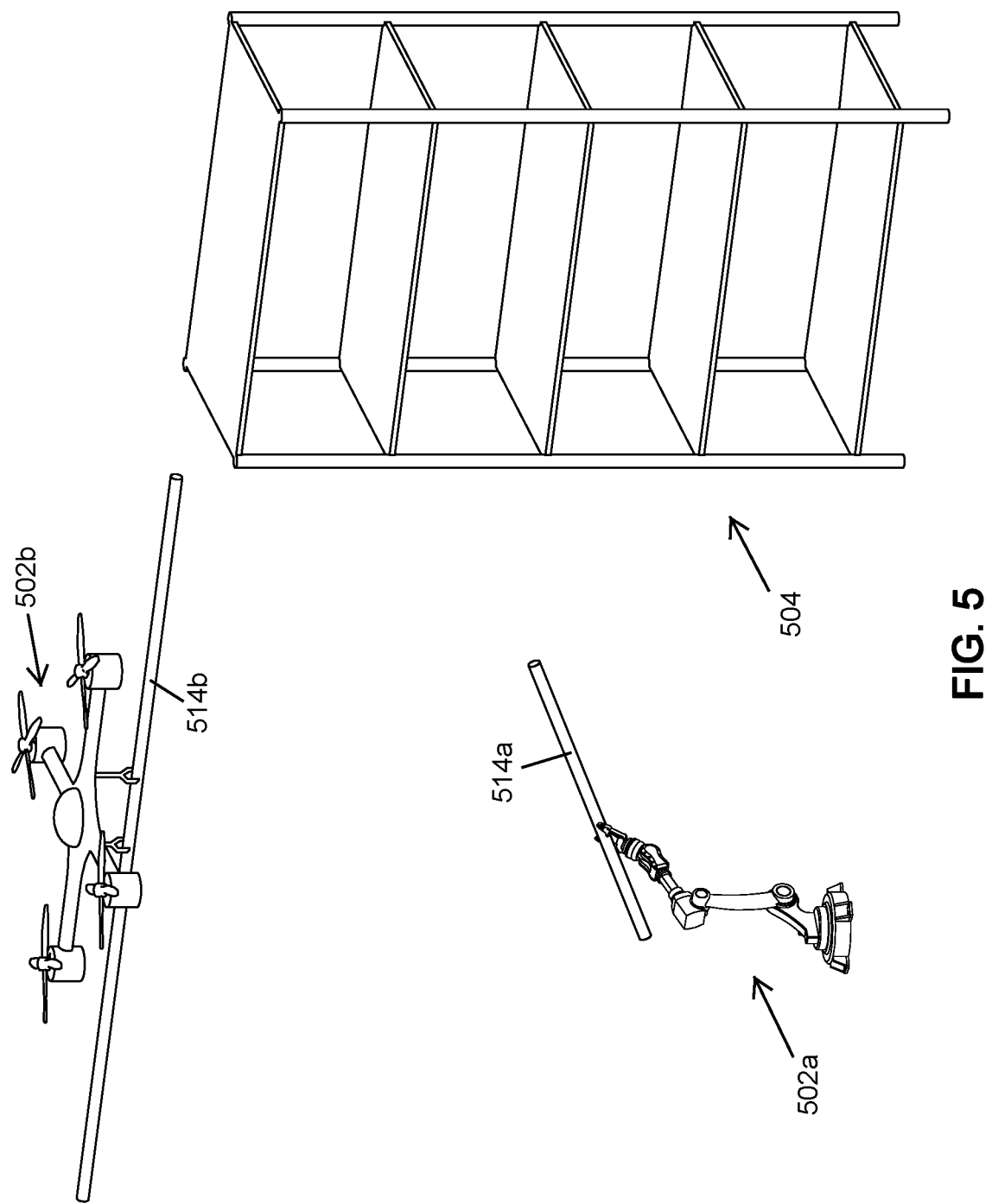
FIG. 5 illustrates two robots working together to build a material movement track according to at least one embodiment.
Figure 6:
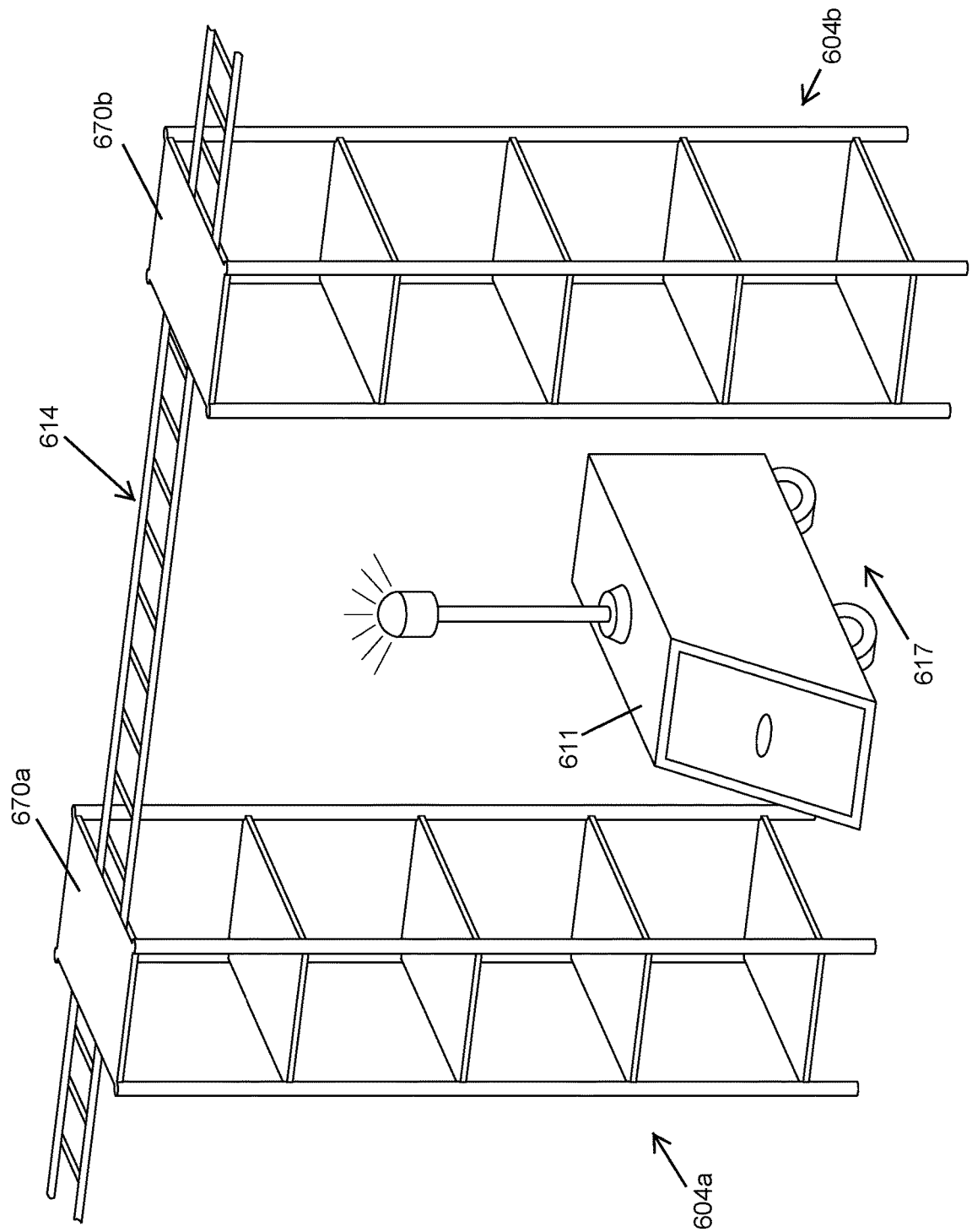
FIG. 6 illustrates a material movement track built according to at least one embodiment for a ground mobility requirement to leave ground space for movement of other objects.
Figure 8:
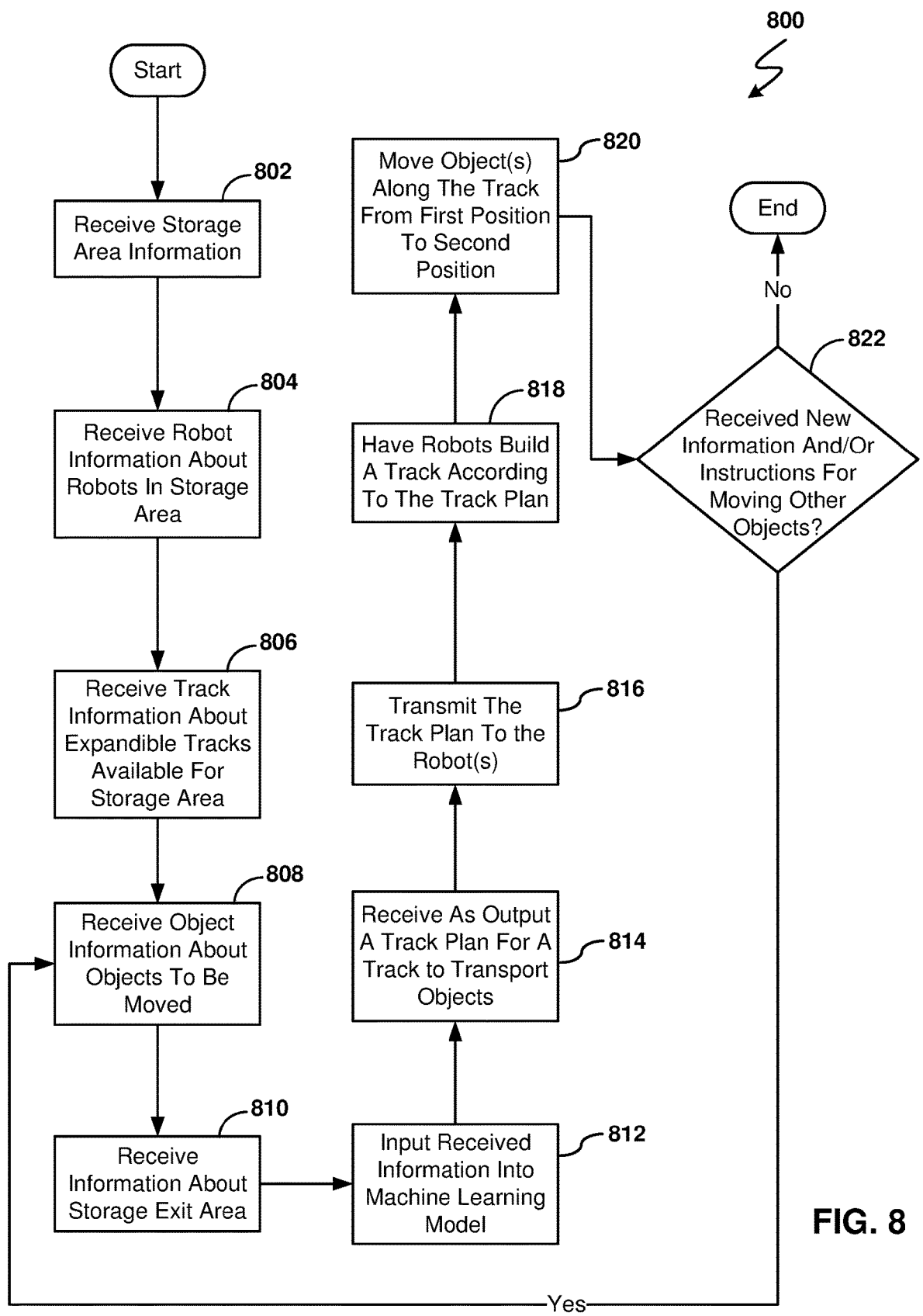
FIG. 8 is an operational flowchart illustrating an on demand track creation process according to at least one embodiment.

One or more robots such as the first and second robots 102a and 102b shown in FIG. 1, another robot 202 shown in FIG. 2A, the robot vehicle 211 shown in FIG. 2B, another pair of robots 302a, 302b shown in FIGS. 3A and 3B, another robot pair shown in FIG. 5 that includes a ground-based robot 502a and a drone robot 502b capable of flying, and another control robot 611 that has wheels, is mobile, and is shown in FIG. 6 may be used in the track creation process 800 described in FIG. 8 to facilitate automated movement of the goods/objects within the track creation environment 100. The various robots may according to the track creation process 800 obtain track components and arrange the track components to build a track system to facilitate the above-described needed movements of goods/objects within the track creation environment 100.

The various robots may use track segments such as the first track segment 114a and the second track segment 114b shown in FIG. 1, a telescopic track segment 214 shown in FIGS. 2A and 2B, and a foldable track segment 314 shown in FIGS. 3A and 3B to build a track to move goods.

The track that is built may facilitate the movement of goods from the shelves to the vehicle 112 for loading onto the truck or from the vehicle 112 to the shelves such as the first and second multi-level shelves 104a, 104b for loading onto the shelves. FIG. 1 shows a storage position 108 for the objects 106 on a top level of the first multi-level shelf 104a. FIG. 1 also shows a transport position 110 on the vehicle 112 whereto or wherefrom the objects 106 may be moved for shipping to or from another destination. In the embodiment shown in FIG. 1 a movement direction 116 shows a movement of the objects 106 being moved from the shelves, e.g., from the first multi-level shelf 104a and the second multi-level shelf 104b, to the transport position 110 at the vehicle 112.

The first track segment 114a and the second track segment 114b are in some embodiments and as shown in FIG. 1 both integrated with and connected to the top shelf of the second multi-level shelf 104b (on opposite sides thereof) to help build a track according to a computer-generated track plan for movement of the goods and objects from the storage position 108 to the transport position 110 or from the transport position 110 to the storage position 108. In this manner, a particular shelf, e.g., a top shelf, of a multi-level shelf may form part of a track segment of an on-demand material movement track.

FIG. 2A illustrates another 202 robot carrying a telescopic track segment 214 according to at least one embodiment. This other robot 202 may include a robot base 208, a pivot bearing 210, first and second pincher arms 206a, 206b, and first and second pinchers 228a, 228b. A robot control computer 252a may be disposed in or on this other robot 202 to control movement of the components of this other robot 202 which together may have a combined robot movement. The robot control computer 252a may generate and/or receive a track plan to help control its movement and actions to help build an on demand material movement track according to present embodiments. The robot control computer 252a may include external and internal components as are described in FIG. 9.

The various robots including this other robot 202 may in at least some embodiments include a pincher and/or grasper for grabbing the track segments. The pincher and/or grasper may in some embodiments be disposed at the end of arms or projections of the robots to facilitate a wider distance range for grabbing. By grabbing the expandible track segments with a pincher and/or a grasper, the respective robot, e.g., other robot 202, is able to move the track segment to an appropriate position that matches a track plan that has been generated for building a track to transport goods thereon. FIG. 2A shows that the other robot 202 includes (1) a first pincher arm 206a that has a first pincher 228a on its end and (2) a second pincher arm 206b that has a second pincher 228b on its end. One or both of the first and the second pincher arms 206a, 206b may be actuated to be distanced from each other to create a gripping opening. The remaining components of the other robot 202 may move the first and the second pincher arms 206a, 206b with the first and the second pincher arms 206a, 206b being in the opened position so that the first and the second pincher arms 206a, 206b surround a track segment, e.g., a pole or bar of a track segment. When the first and the second pincher arms 206a, 206b surround the track segment, one or both of the first and the second pincher arms 206a, 206b may be actuated to move closer to each other or to the other so that the two arms together may grab/grasp the track segment. FIG. 2A shows the first and the second pincher arms 206a, 206b in a grasping position in which the first and the second pinchers 228a, 228b firmly contact and grasp the telescopic track segment 214. In this grasping position, movement of the robot arm results in movement of the telescopic track segment 214 so that the telescopic track segment 214 may be moved into a position that matches a generated track plan for building an on demand material movement track.

The components of the other robot 202 may work together to provide three degrees of freedom of movement for the arm and an object such as the telescopic track segment 214 that is grasped by the arm. The other robot 202 may grab and then move an object vertically, laterally, and translationally. The other robot 202 may also rotate a grasped object using a pivot bar and a rotational bearing at the junction of the pincher arms and using other arms or levers of the other robot 202. The robot 202 may include various levers, fulcrums, servos, pivot bars, and rotational bearings to achieve the multiple degrees of freedom of movement. The robot control computer 252a may send control signals to servos and/or motors/engines throughout the robot to control movement of these individual components and of the other robot 202 as a whole.

The robot base 208 may include a pivot bearing 210 for receiving a rotational arm member. The rotational arm member may be rotated within the pivot bearing 210 to allow the other robot 202 to rotate a grasped object in any direction. The robot base 208 may include a plurality of supports connected around its periphery. The supports may include an opening for a fastener to allow the other robot 202 to be secured to a floor of a warehouse or to a floor of a vehicle. In some embodiments, one or more wheels and wheel axles may be joined to the base such as the robot base 208 to allow enhanced freedom of movement of the respective robot. In that embodiment, the robot control computer 252b may provide movement instructions for the wheels and an engine or motor powering those wheels. The robot control computer 252b may also receive and/or generate a track plan and may send control signals to servos and/or motors/engines throughout the robot vehicle 211 and the first and second robot arms 222a, 222b to control movement of these individual components and of the vehicle robot 211 as a whole.

In some embodiments, the robots may use expandable track segments and may integrate these expandable track segments with an existing fixed material movement track in order to create a track according to a track plan for building a track to move goods and objects. In the embodiment shown in FIG. 2B, a fixed track segment 244 is connected to a middle shelf of the multi-level shelf 204. Robots may connect a track segment to the fixed track segment 244 to help build the on demand material movement track. The fixed track segment 244 may be secured to the multi-level shelf 204 in a permanent manner, e.g., may be welded to the multi-level shelf 204.

FIG. 2B shows first and second robot arms 222a, 222b of a robot vehicle 211 grasping both ends of the telescopic track segment 214 to telescopically extend the telescopic track segment 214 so that a length of the telescopic track segment 214 is increased, e.g., to a maximum or near-maximum length. The first robot arm 222a may engage a first end of the telescopic track segment 214 and secure this end to an end of the fixed track segment 244 to help build the on-demand material movement track. For example, the telescopic track segment 214 may engage the fixed track segment 244 in an arm/receiver manner whereby the end of the telescopic track segment 214 is inserted into a receiver opening of the track bar of the fixed track segment 244.

Thus, for the track creation environment 100, via a fixed track segment one or more expandable track segments may be indirectly connected to product shelves. The expandable track segments may be connected by the robots to shelf sections or to fixed track segments on various levels such as a top shelf section, a bottom shelf section, and one or more middle shelf sections.

FIG. 2B illustrates a robot vehicle 211 with multiple robot arms, e.g., first and second robot arms 222a, 222b which may work separately or together for grabbing and moving objects such as track segments to build or reconfigure a track. The robot vehicle 211 may include a base platform with wheels and with the first and second robot arms 222a, 222b being secured to the base platform. The telescopic track segment 214 may be extended or compacted by the first and second robot arms 222a, 222b grasping ends and moving away from each other or towards each other, respectively. The robot vehicle 211 may be implemented for track building in at least some embodiments to allow a reduction of a total number of robots that are needed for building the track and to decrease a necessary time for building a track.

FIGS. 3A and 3B illustrate a pair of other robots working together to unfold a foldable track segment 314 to use in the unfolded position as part of an on-demand material movement track. FIG. 3A shows the foldable track segment 314 in a folded position. FIG. 3B shows the foldable track segment 314 in an unfolded position. A left robot 302a of this robot pair may grasp a first side of the foldable track segment 314. A right robot 302b of this robot pair may grasp an opposite side, e.g., a right side, of the foldable track segment 314 to help generate an unfolding of the foldable track segment 314. FIG. 3B shows that the foldable track segment 314 may include a hinge 326 which facilitates folding and unfolding of the foldable track segment 314. The left and right robots 302a, 302b may grab ends or portions of the foldable track segment 314 and lift, rotate, and/or pull the foldable track segment 314 to rotate the foldable track segment 314 around the hinge 326 and another hinge and to thereby move the foldable track segment 314 into an unfolded position. The hinge 326 may be disposed at a junction region between two pieces of the foldable track segment 314. In a folded position as shown in FIG. 3A, these two pieces may be disposed to be adjacent and on top of each other to contact each other along their longitudinal sides. In an unfolded position as shown in FIG. 3B, these two pieces may be disposed to be colinear with each other and contacting each other at their ends.

The foldable track segment 314 may in the unfolded position shown in FIG. 3B be connected to one of the shelves or fixed track segments in a warehouse for building an on demand material movement track. For certain track length demands, the foldable track segment 314 may in the folded position shown in FIG. 3A be connected to one of the shelves or fixed track segments in a warehouse for building an on demand material movement track.

With the track creation process 800 that will subsequently be described with respect to FIG. 8 and which uses some or all of the components of the track creation environment 100 shown in FIG. 1, robots such as industrial robots, wheel-based robots, and drones, may be used to set up a track of track segments that are expandable. The track segments may be expandable by being telescopic and/or foldable/unfoldable. The robots may build the track based on changing needs for moving materials/goods/objects from one location to another location. A required number of robots may be enlisted for each track build and/or reconfiguration. The robots may collaborate with each other and, if necessary, with a central computer system, to build and/or reconfigure a track according to a track plan that is generated for moving the goods from a first position associated with a track creation environment 100 to a second position associated with the track creation environment 100. The first position may be a storage position or a transport position. The second position may be a transport position or a storage position.

Figure 4:
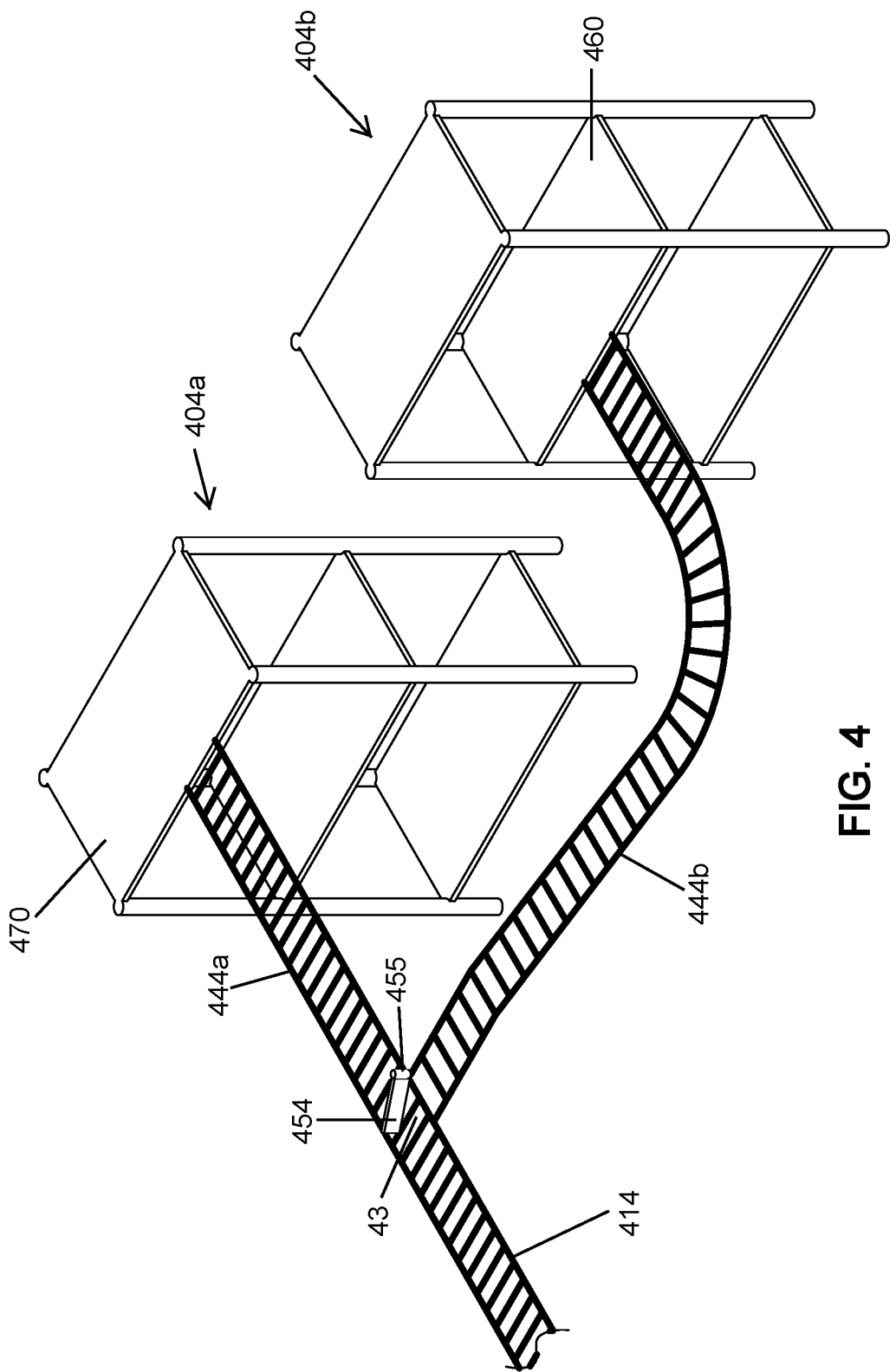
FIG. 4 illustrates another material movement track which, according to at least one embodiment, splits into two branches which lead to shelf levels that have different heights.

FIG. 4 illustrates another material movement track which, according to at least one embodiment, splits into two branches which lead to shelf levels at different heights and which may be built by robots according to the present disclosure. In some embodiments, one or more of the robots may build out a reconfigurable track that may have branches so that some objects starting down a shared section of track then may alternatively move down a first branch of the track or down a second branch of the track. FIG. 4 shows that a main track segment 414 splits into a first branch 444a and a second branch 444b at a junction 43. The one or more robots may build a split track of this design. The first branch 444a may lead to a storage position at a top shelf 470 of a left shelf 404a. The second branch 444b may lead to a storage position at a middle shelf 460 of a right shelf 404b. The top shelf 470 may have a height or elevation that is different, e.g., greater, than a height or elevation of the middle shelf 460. Thus, a track inclination of the first branch 444a may in some embodiments be greater than a track inclination of the second branch 444b.

An object director may be disposed at the junction 43 to help guide objects such as the objects 124 shown in FIG. 1 for movement along either the first branch 444a or the second branch 444b. In the embodiment shown in FIG. 4, the object director may include a guide arm 454 attached to a pivot bar 455. In the instance depicted in FIG. 4, the guide arm 454 extends into the path of the first branch 444a so that objects passing along the main track segment 414 and towards the storage positions would engage against the guide arm 454 and would slide to the opening of the second branch 444b for transport to the middle shelf 460 of the right shelf 404b. In other instances, the pivot bar 455 may be pivoted, e.g., in an automated manner via a servo receiving control instructions from a control computer, so that the guide arm 454 extends into the opening of the second branch 444*b* and objects proceeding along the main track segment 414 would engage against the guide arm 454 and be guided or pushed into the first branch 444*a* for storage in the top shelf 470 of the left shelf 404*a*. Such object director may be controlled via instructions from a central computer controlling the robots for building the track and/or from another central computer organizing product movement along the on demand material movement track.

In some embodiments, the split track that is built out by the robots may allow transporting the objects from the same group to transfer or move down the first branch and the second branch simultaneously. Thus, in an unloading procedure goods from the vehicle 112 may be passed down a branched built-out track and may simultaneously in this manner be loaded onto shelves on different levels of the second multi-level shelf 104*b*, on different levels of the first multi-level shelf 104*a*, or on shelves on different levels of different overall shelves such as one middle shelf of the first multi-level shelf 104*a* and a top shelf of the second multi-level shelf 104*b*. Also, in a loading procedure goods may come from shelves on different levels of the second multi-level shelf 104*b*, on different levels of the first multi-level shelf 104*a*, or on shelves on different levels of different overall shelves such as one middle shelf of the first multi-level shelf 104*a* and a top shelf of the second multi-level shelf 104*b* and be passed down a branched built-out track and may simultaneously in this manner be loaded onto the vehicle 112. The loading procedure for such a branched track may in some embodiments include placing the objects onto the track branches in a staggered timing so that the objects may enter in a staggered or zipped manner onto the shared section, e.g., the main track segment 414 in FIG. 4, of the branched track. The branches may lead to shelf sections at different elevation levels on the same multi-shelved structure, onto shelf sections of the same elevation levels from different multi-shelved structures, and/or onto shelf sections at different elevation levels from different multi-shelved structures.

In other embodiments, the track that is built by the robots will help facilitate movement of goods between a first storage position and a second storage position that are both within the track creation environment 100, e.g., that are both within a warehouse. For example, this movement between different storage positions may be from one shelf to another shelf within a warehouse to account for other goods/objects received or for adjusted transport plans. For example goods may be moved from the top shelf 470 of the left shelf 404*a* shown in FIG. 4 to the middle shelf 460 of the right shelf 404*b*.

FIG. 5 illustrates another robot pair working together to build an on-demand material movement track according to at least some embodiments. The robot pair shown in FIG. 5 includes a ground-based robot 502*a* and a drone robot 502*b* that is a drone and that includes pinchers for carrying a track segment such as the longer track segment 514*b*. The ground-based robot 502*a* in this instance grabs and carries a shorter track segment 514*a*. This ground-based robot 502*a*, the drone robot 502*b*, the shorter track segment 514*a*, and the longer track segment 514*b* may also be used in the track creation environment 100 to help carry out the dynamic track creation process and to facilitate the movement of goods. Robots that are drones may be implemented, for example, to help build track segments that must run high into the air to help transfer goods to high positions on tall shelves. These drones may help in instances when other industrial, ground-based, and/or wheel-based robots are not tall enough or have arms not long enough to reach high positions on some of the shelves. These drones such as the drone robot 502*b* may fly throughout the storage area such as the warehouse to assist with on-demand material movement track creation. Various drones may be used. The drones may include one or more arms, propellers, and rotors to generate flight. The drone robot 502*b* may include a control computer similar to the robot control computer 252*a* shown in FIG. 2A. Such control computer may receive control instructions to control movement of the drone robot 502*b*, track segment grasping of the drone robot 502, and track segment placement by the drone robot 502 to help build an on-demand material movement track. The drone robot 502*b* may include pinchers which may be actuated to grasp, carry, and move a track segment to an appropriate position according to a track plan for building or reconfiguring an on demand material movement track.

In the embodiment shown in FIG. 5, the drone robot 502*b* may connect the longer track segment 514*b* to an upper level of the tall shelf 504 in a manner so that the longer track segment 514*b* extends in a sharp inclination down to the shorter track segment 514*a*. The longer track segment 514*b* and the shorter track segment 514*a* may then be joined to each other by movement of the ground-based robot 502*a* to help make an on demand material movement track or a segment of such an on demand material movement track. The drone robot 502*b* may continue to hold the longer track segment 514*b* until the longer track segment 514*b* is stably secured to the shorter track segment 514*a* that is being held by the ground-based robot 502*a*. Upon securement, a computer of the ground-based robot 502*a* may generate a message for transmission to a computer of the drone robot 502*b* to command release of the longer track segment 514*b* and to command flight of the drone robot 502*b*. The drone robot 502*b* may fly to another area such as a drone robot storage area in the warehouse or to a track segment storage area in the warehouse to grab another track segment for helping build the on-demand material movement track.

A camera on one of the ground-based robot 502*a* and the drone robot 502*b* or a respective camera on both may capture images of the track segments, input the images into a trained machine learning model, and then generate a release signal for the pinchers of the drone robot 502*b* when the output of the trained machine learning model indicates that that the track segment being held by the drone robot 502*b* is reliably secured. The trained machine learning model may be trained in advance with supervised learning and may be stored in various locations such as a database 714 to be subsequently described with respect to FIG. 7, a data storage device 706 of a computer 702, a control computer of the ground-based robot 502*a*, and/or a control computer of the drone robot 502*b*. This image-based track segment securement confirmation may be implemented in various embodiments including in those exclusively using ground-based robots such as those embodiments shown in FIGS. 2A, 2B, 3A, and 3B. Cameras may be distributed on robots and further around the warehouse, e.g., on walls or on some of the shelves, to help determine when track segment engagement and securement have been achieved for building the on demand material movement track.

With the track creation process 800 that will subsequently be described with respect to FIG. 8 and which uses some or all of the components of the track creation environment 100 shown in FIGS. 1-6, based on a required length and/or size of a material handling track to be built and/or reconfigured, an appropriate number of robots will work together and collaborate with each other to build the material movement track according to a generated track plan, so that packages can be moved from one location to another location. The robotic system may perform appropriate track alignment of pieces of the track, shelves, and fixed track portions. The robotic system may help place track segments with an appropriate inclination to facilitate movement of goods between positions that have different elevations. FIG. 1 shows that the second robot 102b has built a track segment by positioning the second track segment 114b at an inclination 120 to accommodate an elevation difference between a top shelf of the second multi-level shelf 104b and the transport position 110 for objects in the vehicle 112. Specifically, in this example the top shelf of the second multi-level shelf 104b has a first elevation. The transport position 110 for the objects in the vehicle 112 has a second elevation. In the depicted example, the first elevation is greater than the second elevation.

FIG. 6 illustrates an on demand material movement track built by one or more robots according to at least one embodiment and which incorporates a ground mobility requirement so that the built track leaves ground space for movement of other objects while the track is in use to transport objects. FIG. 6 shows that a ground mobility allowing track segment 614 is elevated high above a ground level so that objects may be transported via the ground mobility allowing track segment 614 while a robot travel path 617 is left open underneath the ground mobility allowing track segment 614. FIG. 6 shows that the robot travel path 617 is an open area underneath the ground mobility allowing track segment 614 and between a first five-level shelf 604a and a second five-level shelf 604b. FIG. 6 shows that a control robot 611 is traveling in the robot travel path 617. Objects such as the objects 124 shown in FIG. 1 may be transported along the ground mobility allowing track segment 614 simultaneously while the control robot 611 travels through the robot travel path 617. Without this construction, the track may be built in a way that restricts and/or blocks movement of robots in the vicinity. Although a control robot 611 is shown in FIG. 6 as traveling through the robot travel path 617, other robots, robot vehicles, forklifts, and/or people may travel through the robot travel path 617 due to the elevated nature of the ground mobility allowing track segment 614.

FIG. 6 also shows that the ground mobility allowing track segment 614 includes a fifth shelf 670a of the first five-level shelf 604a and another fifth shelf 670b of the second five-level shelf 604b. In this manner, some shelves in the storage areas may be part of the ground mobility allowing track segment 614 to facilitate the dual usage of objects on the track and people or robots on the ground. An object shipment plan generated by a computer may have such shelves be vacated before being used as part of a particular track segment. Alternatively, a control computer may confirm, e.g., with a camera image check, that a particular shelf is empty before being used as an intermediate part of a track segment.

This configuration may be helpful, for example, in an area of a warehouse where other robots and/or forklifts need to move while objects are being transported down the movement track. In some embodiments, the track is built in a side or elevated portion of the warehouse. Building the track in a side area or elevated area may allow sufficient space on the ground of the warehouse for ground-based robots and/or forklifts and/or other workers to move while objects are transported along the track. In this embodiment, the track plan that is produced by a computer may allow this ground mobility requirement to override another objective of using the shortest possible path for the track between the first and the second positions. For example, a track to a high portion of a shelf may use long support beams which allow the track platform to be disposed high in the air so that objects may be moved to the high shelf while a robot drives on the ground and passes underneath the high track segment.

FIGS. 1, 2A-2B, 3A-3B, 5, and 6 show the first robot 102a, the second robot 102b, the other robot 202, the robot vehicle 211, the left robot 302a, the right robot 302b, the ground-based robot 502a, the drone robot 502b, and the control robot 611 as examples of robots that may be used to help build the track and perform the track creation process 800 that is shown in FIG. 8 and will be subsequently described. In some embodiments the robots may include a set of wheels which allow the robots to roll along the ground. In some embodiments some robots may be used which have a stationary base but which have rotatable and moveable arms. The first, second, and other robots 102a, 102b, and 202 show examples of this type of robot. The movable arm may be formed by connected levers whose various extensions may cause extension of the arm so that the arm end may be at different horizontal and vertical positions within its reach, e.g., within its maximum reach.

It should be appreciated that FIGS. 1, 2A-2B, 3A-3B, 4, 5, and 6 provide illustrations of some implementations and do not imply any limitations with regard to the environments in which and robots and track structures with which different embodiments may be implemented. Many modifications to the depicted environments and structures may be made based on design and implementation requirements.

Figure 7:
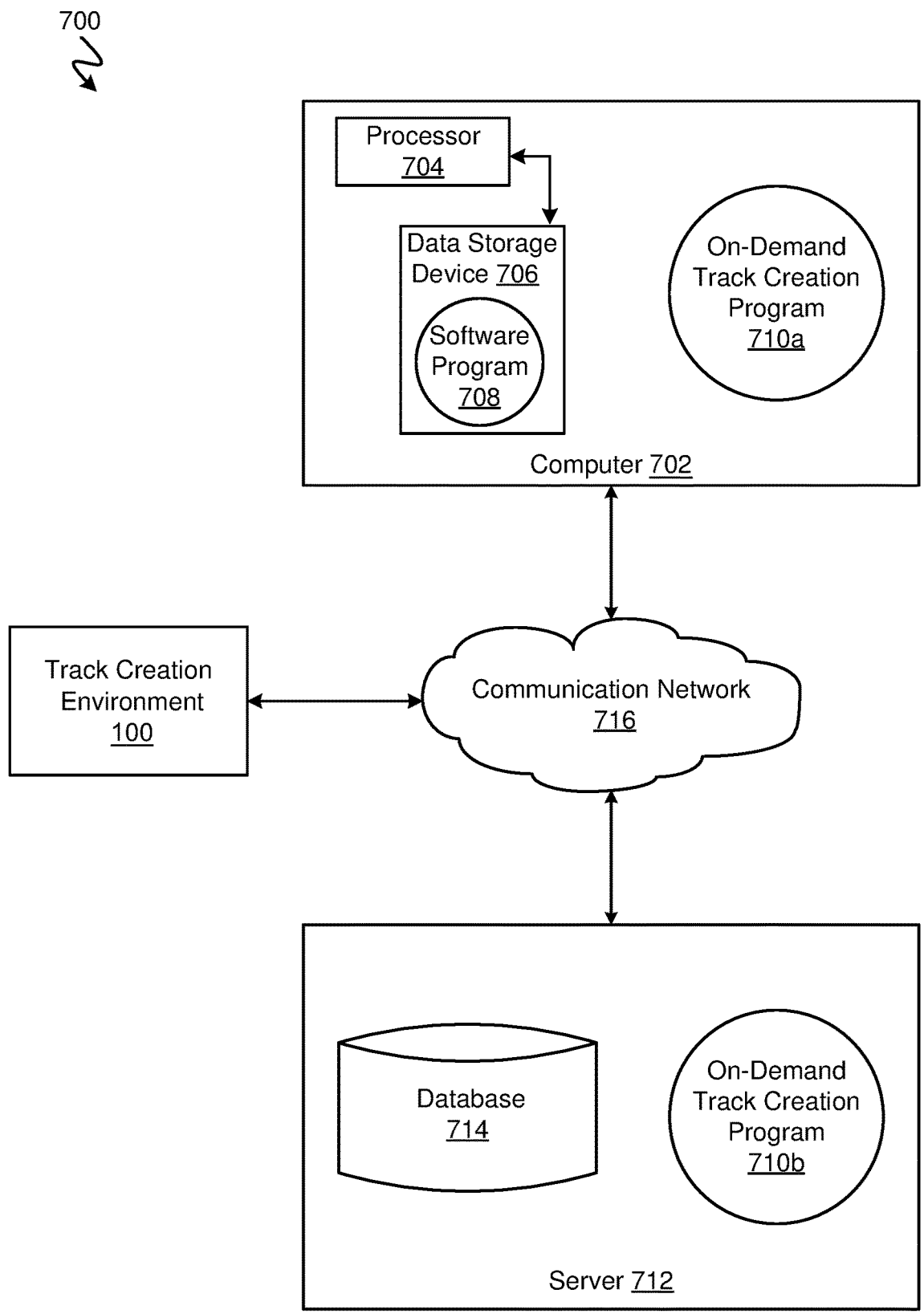
FIG. 7 illustrates a networked computer environment according to at least one embodiment.

Referring to FIG. 7, an exemplary networked computer environment 700 in accordance with one embodiment is depicted and which may include the track creation environment 100 that is depicted in FIG. 1 as well as in FIGS. 2A-2B, 3A-3B, and 4-6. The networked computer environment 700 may include a computer 702 with a processor 704 and a data storage device 706 that is enabled to run a software program 708 and a track creation program 710a. The networked computer environment 700 may also include a server 712 that is a computer and that is enabled to run a track creation program 710b that may interact with a database 714 and a communication network 716. The server 712 may include a plurality of machine learning modules and/or may use the communication network 716 to access other servers which host machine learning models. The networked computer environment 700 may include a plurality of computers 702 and servers 712, although only one computer 702 and one server 712 are shown in FIG. 7. The communication network 716 allowing communication between the computer 702 and the server 712 may include various types of communication networks, such as the Internet, a wide area network (WAN), a local area network (LAN), a telecommunication network, a wireless network, a public switched telephone network (PTSN) and/or a satellite network.

It should be appreciated that FIG. 7 provides only an illustration of one implementation and does not imply any limitations with regard to the environments in which different embodiments may be implemented. Many modifications to the depicted environments may be made based on design and implementation requirements.

The client computer 702 may communicate with the server 712 via the communication network 716. Individual robots within the track creation environment 100 may also communicate with the client computer 702 and/or the server 712 via the communication network 716. The communication network 716 may include connections such as wire, wireless communication links, and/or fiber optic cables. As will be discussed with reference to FIG. 9, server 712 may include internal components 902a and external components 904a, respectively, and client computer 702 may include internal components 902b and external components 904b, respectively. Server 712 may also operate in a cloud computing service model, such as Software as a Service (SaaS), Platform as a Service (PaaS), or Infrastructure as a Service (IaaS). Server 712 may also be located in a cloud computing deployment model, such as a private cloud, community cloud, public cloud, or hybrid cloud. Client computer 702 may be, for example, a mobile device, a telephone, a personal digital assistant, a netbook, a laptop computer, a tablet computer, a desktop computer, or any type of computing devices capable of running a program, accessing a network, and accessing a database 714 in a server 712 that is remotely located with respect to the client computer 702. The client computer 702 may be mobile and may include a display screen and a camera. According to various implementations of the present embodiment, the track creation program 710a, 710b may interact with a database 714 that may be embedded in various storage devices, such as, but not limited to a computer/mobile device 702, a networked server 712, or a cloud storage service.

Figure 9:
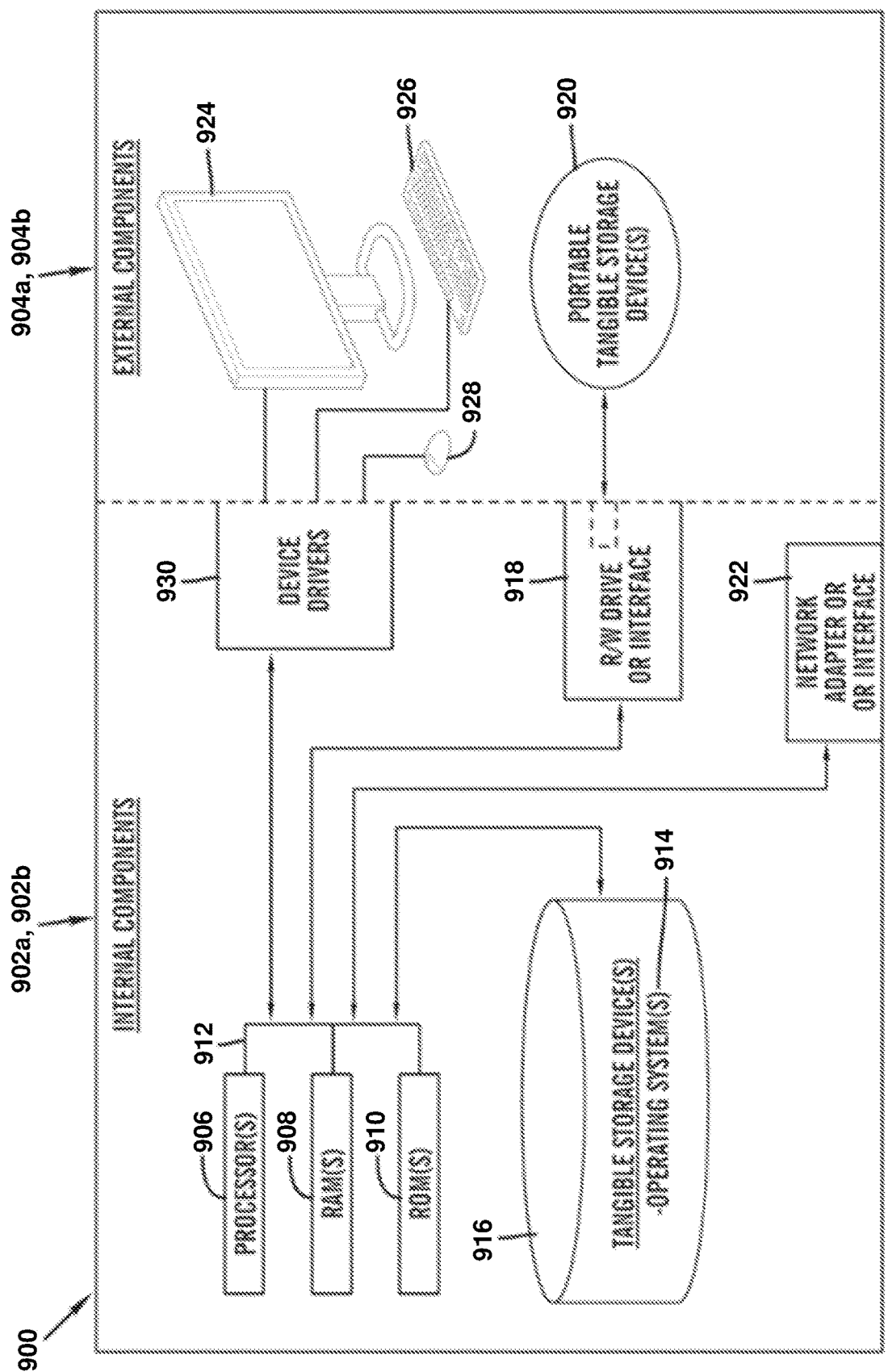
FIG. 9 is a block diagram of internal and external components of computers and a server depicted in FIGS. 2A-2B and FIG. 7 according to at least one embodiment.

As will be discussed with reference to FIG. 9, the server 712 may include internal components 902a and external components 904a, respectively. The computer 702 and interior computers of the various robots of the track creation environment 100 such as the robot control computer 252a shown in FIG. 2A or the robot control computer 252b shown in FIG. 2B may also each include internal components 902b and external components 904b as depicted in FIG. 9. Server 712 may also operate in a cloud computing service model, such as Software as a Service (SaaS), Platform as a Service (PaaS), or Infrastructure as a Service (IaaS). Server 712 may also be located in a cloud computing deployment model, such as a private cloud, community cloud, public cloud, or hybrid cloud. The computer 702 may each be, for example, a mobile device, a telephone, a personal digital assistant, a netbook, a laptop computer, a tablet computer, a desktop computer, or any type of computing devices capable of running a program, accessing a network, and accessing a database 714 in a server 712 that is remotely located with respect to the computer 702. The computer 702 and computers of the robots may each include a display screen, a speaker, a microphone, a camera, and a keyboard or other input device for receiving output and providing input to the respective computer. According to various implementations of the present embodiment, the track creation program 710a, 710b may interact with a database 714 that may be embedded in various storage devices, such as, but not limited to a various computers/mobile devices, a server 712 that may be in a network, or another cloud storage service.

The track creation program 710a, 710b may be used to generate a track plan based on various warehouse inputs that are received. The track creation program 710a, 710b may then transmit the track plan to receiver components of computers that are on-board the one or more robots that will carry out the track building/reconfiguration. In some embodiments, a robot such as the control robot 611 shown in FIG. 6 or a group of robots or one of the robots depicted in the other drawings will host a central computer which generates the track plan and then communicates instructions to receivers of computers on the other robots.

The track creation program 710a, 710b may also generate and transmit a track plan, progress, and approval messages to be transmitted to another computer for review and/or approval of an administrator and/or manager of the track creation environment 100, e.g., of a warehouse. In some embodiments, the track creation program 710a, 710b may require approval from an administrator before authorizing the robots to carry out a track reconfiguration or to try a technique, orientation, or position of a track build which has not previously been completed and/or attempted at this facility. For example, a track plan generated at a robot computer of the first robot 102a or at the server 712 may be sent via the communication network 716 to a manager at the computer 702 for approval of the track plan. A machine learning model may determine whether the track plan constitutes a new or previously unused configuration that should be reviewed by a manager. If the machine learning model outputs that the proposed track plan exceeds a threshold of uniqueness, the track creation program 710a, 710b may in an automated manner generate and transmit a message to an administrator to request authorization to implement the proposed track plan.

Referring now to FIG. 8, an operational flowchart depicts a track creation process 800 that may, according to at least one embodiment, be performed using the track creation program 710a, 710b and the various components shown in the track creation environment 100 shown in FIG. 1 and with the various robots and track segments shown in FIGS. 2A-2B, 3A-3B, and 4-6. The track creation program 710a, 710b may include various modules, user interfaces, services, and virtual meeting tools and may use data storage when the track creation process 800 is performed.

In a step 802 of the track creation process 800, storage area information is received. This information may include a number, type, and position of shelves that are in the storage area. The information may include distances between any shelves and a size of any aisles or walkable areas between shelves. If the track creation environment 100 is an enclosed area, the information may include dimensions such as length, width and height of the building, e.g., of the warehouse, and a height of the ceiling and a position of any lights and whether the position of the lights is/are flexible. The information may include dimensions and number of docks, e.g., loading/unloading docks, that lead into the track creation environment 100. The vehicle 112 and other trucks may engage at such docks. The information may include size and location of other interior doorways within the track creation environment 100. The information may include size, dimensions, positions, and type of any fixed tracks and/or fixed track segments that are already set up in the storage area. These fixed tracks and/or fixed track segments may have a configuration that is not easily reconfigured, e.g., has welded connections, so that the fixed track is referred to as being fixed, as compared to other track segments which may be easily reconfigured by the robots. This information may also include a number, type, and current position of objects 106 and/or other goods or packages which are already being stored in the storage area, e.g., in shelves within the storage area. A type of the object may indicate a degree of fragility of each object. This fragility information may be used to determine a track type which may most gently accommodate and transport objects of a fragile nature.

This information may be received in step 802 by a user uploading the information into a computer such as the computer 702. The information may be uploaded at another computer and transmitted via the communication network 716 to the computer 702 or to one of the robots.

In some embodiments, one or more robots may maneuver around the storage area and the track creation environment 100 and use an attached scanner and/or camera and/or sonar sensor to gather the information about the storage area as a part of step 802.

In a step 804 of the track creation process 800, robot information about robots in the storage area is received. This information may include a number, type, dimensions, and current position of robots in the storage area or available to be brought into the storage area. This robot information may be received in a similar manner that the storage area information was received in step 802.

In a step 806 of the track creation process 800, track information about expandible tracks available for the storage area is received. This information may include a type, number, dimensions, and current position and setup of the expandible track segments that are currently in the storage area and/or available to bring into the storage area. Information about other movable track segments available for use in building the on demand material movement track may be received as well as a part of step 806

In a step 808 of the track creation process 800, object information about objects to be moved is received. This information may include a number, type, and current position of objects 106 and/or other goods or packages which are designated to be moved by the track that is to be created and/or built. The type of the object may indicate a degree of fragility of each object. This information may indicate whether the objects have arrived at the facility at a loading dock, e.g., having been transported by the vehicle 112, and need to be moved into storage. This information may alternatively indicate that the objects are already in a storage position within the facility and need to be moved to another storage position or to a transportation position, e.g., to a vehicle 112 for taking the objects 106 to another warehouse or facility.

In a step 810 of the track creation process 800, information about the storage exit area is received. This information may include details about a transport device such as the vehicle 112 which may engage with the facility for loading and/or unloading. Although a vehicle 112 in the form of a van is shown in FIG. 1, a truck, a train, a boat, and/or some other vehicle and/or mode of transportation may engage with the facility to receive or take objects 106 for transport. The information received in step 810 may include a size and dimensions of cargo area for the vehicle 112. The information may include a number, type, size, and position of any transit shelves that are within the vehicle, e.g., are within the cargo area of the vehicle 112, for holding the objects 106 during their transport.

In a step 812 of the track creation process 800, the receiver information is input into a machine learning model This information may include that information that was received in the various steps 802, 804, 806, 808, and 810.

The machine learning model for step 812 may include naïve Bayes models, random decision tree models, linear statistical query models, logistic regression n models, neural network models, e.g. convolutional neural networks, multi-layer perceptrons, residual networks, long short-term memory architectures, algorithms, deep learning models, and other models. The machine learning model used in step 812 may be trained. The process of training a machine learning model may include providing training data to a learning algorithm or to a machine learning algorithm. The machine learning model is the model structure or system that is created by the training process. The training data should include targets or target attributes which include a correct answer. Training data for the present embodiments may include similar information for other warehouses and/or facilities and appropriate track plans and tracks that were generated for transporting goods in those other warehouses. The learning algorithm finds patterns in the training data in order to map the input data attributes to the target. The machine learning model contains these patterns so that the answer can be predicted for similar future inputs. A machine learning model may be used to obtain predictions on new data for which the target is unknown. The machine learning model uses the patterns that are identified to determine what the target is for new data without a given answer. Training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the computer 702 or at another computer associated with the server 712. The machine learning model that is generated may be stored on computer 702 or on the server 712 or on another external server accessible to the computer 702 and to the server 712 via the communication network 716. The automated design of the track plan may be performed via a machine learning model on the device or in the cloud. Using a machine learning model on the device, e.g., on a computer that is within one of the robots, helps reduce data transmission required between the device, the robots, and a server in the cloud. Such a mobile machine learning model may be performed using inference-based machine learning models such as TensorFlow® Lite (TensorFlow® and all Tensor-Flow®—based trademarks and logos are trademarks or registered trademarks of Google, Inc. and/or its affiliates).

The track creation program 710a, 710b may also use mathematical calculations as part of the machine learning model for designing the track plan.

In a step 814 of the track creation process 800, a track plan for a track to transport objects is received as output. This track plan may be the output that is produced by the machine learning model in response to inputting that information into the machine learning model as occurred in step 812. This track plan may include a sequence of steps and acts needed to build and/or reconfigure a track to fulfill the particular movement requirement for a group of objects/goods/ This track plan may include the robots to be used, e.g., the types, number, and identities of the robots to be used, the types, number, and identities of the track segments to be used, a length for expanding or reducing individual expandible track segments, a sequence of steps for the track building, and/or other instructions. The identities of the robots and track segments may refer to unique serial numbers of individual robots/track segments that are stored and tracked by the track creation program 710a, 710b

In a step 816 of the track creation process 800, the track plan is transmitted to the one or more robots. This track plan may be that plan that was received as output in step 814. This transmission of step 816 may occur via the communication network 716 that is shown in FIG. 7. Each robot within the track creation environment 100 shown in FIGS. 1, 2A-2B, 3A-3B, and 4-6 may be connected to the communication network 716.

For those embodiments where a control computer with one of the robots generates the track plan, this transmission may occur within the robot and from the interior control computer of the robot to one or more other computers within the same robot for moving the arms, wheels, and/or wings of the robot to carry out the building instructions. When multiple robots are to be involved in the track creation process 800, a lead robot, e.g., the control robot 611, with the control computer may transmit the instructions in a message via the communication network 716 to the one or more other robots.

In a step 818 of the track creation process 800, the robots build a track according to the track plan. Robots such as the first robot 102a, the second robot 102b, the other robot 202, the robot vehicle 211, the left robot 302a, the right robot 302b, the ground-based robot 502a, the drone robot 502b, and the control robot 611 may carry track segments such as the first and second track segments 114a, 114b, the telescopic track segment 214, the foldable track segment 314, track branches such as the first branch 444a and the second branch 444b, the shorter track segment 514a, and the longer track segment 514b to make a path for moving objects between first and second positions within the track creation environment 100, e.g., between storage and transport positions of the track creation environment 100

In a step 820 of the track creation process 800, one or more objects are moved along the track from a first position to a second position. A track motor and/or gravity forces may be used to generate a movement force for moving the objects 106 along the track that was built. The loading of the objects onto and/or off of the track that was built may occur in an automated, semi-automated, or non-automated manner.

The track plan that is produced by a computer in step 812 and 814 for the robots to build out a track may in some embodiments incorporate considerations of gravitational forces that may be utilized to cause material movement. Although a motor may be present in the track creation environment 100 to power object movement down the track, in some instances relying on gravitational forces may allow motor power to be reduced or redirected toward other areas.

In at least some embodiments, the expandable track and any fixed track may include one or more rollable platforms, e.g., conveyor belts, with a motor being present to rotate the rollable platform and, thereby, transfer any objects that are sitting on the rollable platform.

In at least some embodiments, the expandable track may include a pair of rails extending longitudinally with support arms extending across to connect the first rail and the second rail. Those support arms may be distributed intermittently along the length of the first and the second rails. The track may include a transfer arm which is moved in a longitudinal direction down the track so that the support arm extending into the track area may push or pull the objects/goods along the way in the desired movement direction. The track may alternatively include movement wheels which protrude up into an object receiving area of the track. Objects are passed along the rotating wheels for them to be transferred along the track. This use of protruding wheels may reduce frictional forces that push against the objects as the objects move along the track.

A choice of track that is implemented and to be built by the one or more robots may also depend on physical characteristics such as size of the objects that are to be moved. Some packages/object with consistent cuboid shapes may match the track type that has the two rails. Other packages may be better suited for the movable platform track type, e.g., that includes a conveyor belt. The machine learning model(s) may account for this information, e.g., in step 808.

The track plan may also incorporate the calculation of determining the shortest possible material movement path between the two positions, e.g., between storage and loading positions. This implementation may decrease an overall time required to move an object or a group of objects.

When the movement for an object or a group of objects is finished and no other objects are ready to be moved along the track, a track motor may reduce its power and/or turn off so that the movement track is not moving.

Different shelf structures in the track creation environment 100 may have gaps between them. For example, a gap may be present between the first multi-level shelf 104a and the second multi-level shelf 104b. In this configuration, a track segment is needed to transport the objects from the different shelf structures, e.g., from the first multi-level shelf 104a to the second multi-level shelf 104b or vice-versa.

In some embodiments, the one or more robots building the track may change a length of a track base to build the track. This length change may correspond to a necessary distance for extending the track between the first and second positions, e.g., for building the track to extend between storage and transport positions for the objects. The track base may include telescopic and/or foldable segments. The one or more robots may perform telescoping, folding, and unfolding actions to the track base to change a length of the track base to the necessary length for building the track.

In some embodiments, different track sections may have magnetic couplings at their end regions which allow the track sections to be magnetically connected to other adjacent track sections and/or to a metal shelf.

In a step 822 of the track creation process 800, a determination is made as to whether new information and/or new instructions for moving other objects is received. For an affirmative determination of step 822 that new information and/or new instructions for moving other objects has been received, the track creation process 800 proceeds to step 808 for a repeat of steps 808 to 820 based on the new information. For the generation of a new track plan in step 812 and 814 the machine learning model may consider other existing reconfigurable tracks so that the new track can avoid their paths, use other non-used track segments in the vicinity, and/or take some of the track segments for the new track to be built.

For a negative determination in step 822 due to no new information and/or new instructions for moving other objects having been received, the track creation process 800 may end.

It may be appreciated that FIG. 8 provides an illustration of some embodiments and does not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

FIG. 9 is a block diagram 900 of internal and external components of computers depicted in FIG. 7 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The computer 702, the server 712, the robot control computers 252a, 252b and any other robot computer of the various robots in the track creation environment 100 may include respective sets of internal components 902a, 902b and/or external components 904a, 904b illustrated in FIG. 9. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 708 in the computer 702, the track creation program 710a in the computer 702, and the track creation program 710b in server 712 may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 708 and the track creation program 710a, 710b can be stored on one or more of the respective portable computer-readable tangible storage devices 920, read via the respective RAY drive or interface 918 and loaded into the respective hard drive, e.g., the tangible storage device 916.

Each set of internal components 902a, 902b may also include network adapters (or switch port cards) or interfaces 922 such as a TCP/IP adapter cards, wireless wi-fi interface cards, or 3G, 4G, or 5G wireless interface cards or other wired or wireless communication links. The software program 708 and the track creation program 710a in the computer 702 and/or in one of the robots and the track creation program 710b in the server 712 can be downloaded from an external computer (e.g., server) via a network (for example, the Internet, a local area network or other, wide area network) and respective network adapters or interfaces 922. From the network adapters (or switch port adaptors) or interfaces 922, the software program 708 and the track creation program 710a in the computer 702 and the track creation program 710b in server 712 are loaded into the respective hard drive, e.g., the tangible storage device 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
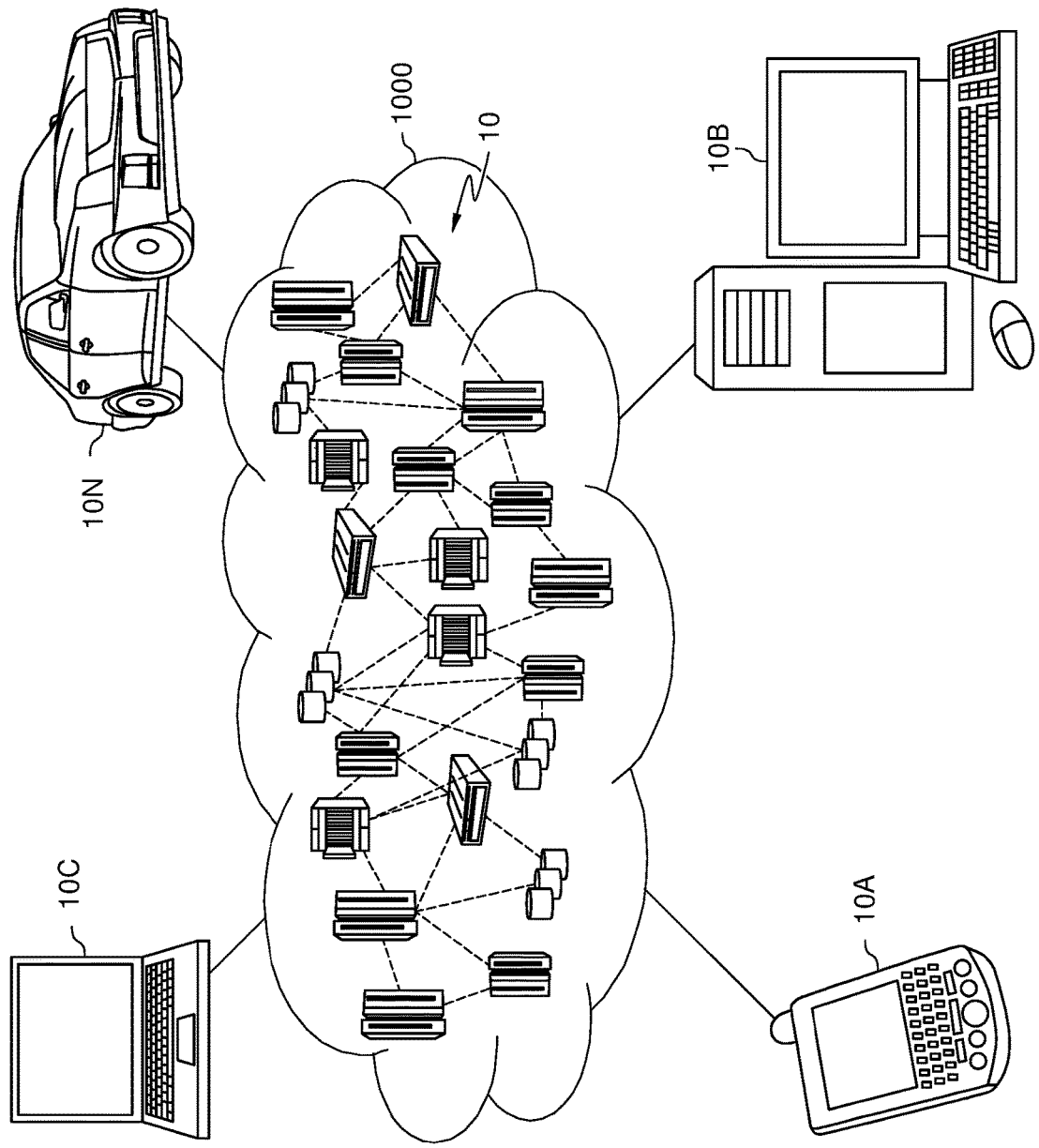
FIG. 10 is a block diagram of an illustrative cloud computing environment including the computer system depicted in FIG. 7, in accordance with an embodiment of the present disclosure.

Referring now to FIG. 10, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 10A, desktop computer 10B, laptop computer 10C, and/or automobile computer system 10N may communicate. Nodes 10 may communicate with one another and may include robots such as the robots shown in FIGS. 1, 2A-2B, 3A-3B, and 5-6. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 10A-N shown in FIG. 10 are intended to be illustrative only and that computing nodes 10 and cloud computing environment 1000 can communicate with any type of computerized device over any type of network and/or network addressable connection (e.g., using a web browser).

Figure 11:
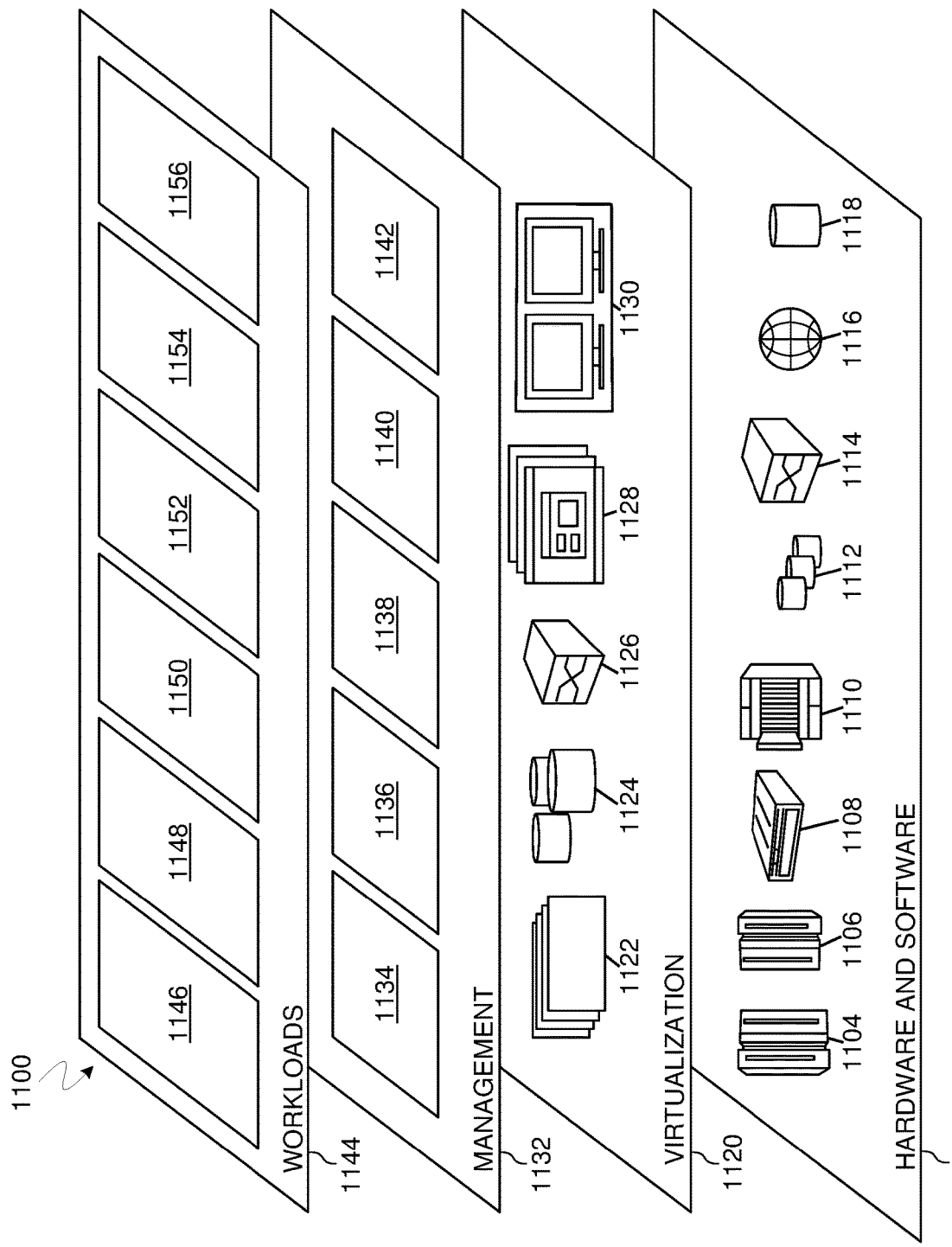
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and track creation management 1156. A track creation program 710a, 710b provides a way to automate construction or reconfiguration of a reconfigurable track in a warehouse environment for moving objects from and/or into storage positions and transport positions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for track creation, the method comprising:
receiving, via a computer, a notification of at least one object to be moved, the at least one object being disposed at a first position;
receiving, via the computer, a determination of a second position for the at least one object;
generating, via the computer, a track plan for a first track for transporting the at least one object from the first position to the second position; and
transmitting, via the computer, a first instruction message to a first robot, the instruction message instructing the first robot to build a track according to the track plan.

2. The method according to claim 1, wherein the track plan includes integrating an expandable track with a fixed track to build the track.

3. The method according to claim 1, wherein the track plan incorporates a ground mobility requirement so that the track leaves ground space for movement of other objects while the track is in use to transport the at least one object.

4. The method according to claim 1, wherein the track plan includes an inclination corresponding to a difference in elevation between the first position and the second position.

5. The method according to claim 1, further comprising:
receiving, via the computer, a determination of a third position for the at least one object;
wherein the track plan is further for a second track for transporting the at least one object from the first position to the third position, and the track plan incorporates the first track and the second track being operated to transport objects simultaneously.

6. The method according to claim 5, wherein the second position and the third position are different in elevation.

7. The method according to claim 1, wherein the instruction message instructs the first robot to change a length of a track base to build the track.

8. The method according to claim 7, wherein:
the track base comprises a characteristic selected from a group consisting of foldable and telescopic, and
the first instruction message includes a track change instruction selected from a group consisting of telescoping, folding, and unfolding the track base.

9. The method according to claim 1, further comprising:
transmitting, via the computer, at least one other instruction message to at least one other robot, the at least one other instruction message instructing the at least one other robot to help the first robot build the according to the track plan.

10. The method according to claim 1, wherein the track plan accounts for a gravitational force for transporting the at least one object from the first position to the second position.

11. A computer system for track creation, the computer system comprising:
one or more processors, one or more computer-readable memories, and program instructions stored on at least one of the one or more computer-readable memories for execution by at least one of the one or more processors to cause the computer system to:
receive a notification of at least one object to be moved, the at least one object being disposed at a first position;
receive a determination of a second position for the at least one object;
generate a track plan for a track for transporting the at least one object from the first position to the second position; and
transmit an instruction message to at least one robot, the instruction message instructing the at least one robot to build a track according to the track plan.

12. A track creation system comprising:
the computer system according to claim 11,
a first robot; and
an expandible track base.

13. The track creation system according to claim 12, wherein the first robot is selected from a group consisting of an industrial robot, a wheel-based robot, and a drone.

14. The track creation system according to claim 12, wherein the expandible track base is telescopic to have its length changed to match a distance for the track plan.

15. The track creation system according to claim 12, wherein the expandible track base is foldable to have its length changed to match a distance for the track plan.

16. The track creation system according to claim 12, wherein the expandible track base is connectible to a fixed track.

17. The track creation system according to claim 12, further comprising a motor for generating movement of the at least one object along the track.

18. The track creation system according to claim 12, wherein the expandible track base comprises a first base section and a second base section connected to the first base section via a magnetic coupling.

19. The track creation system according to claim 12, wherein the computer system is disposed within the first robot.

20. A computer program product for track creation, the computer program product comprising a computer-readable storage medium having program instructions embodied therewith, wherein the program instructions are executable by a computer system to cause the computer system to:
receive a notification of at least one object to be moved, the at least one object being disposed at a first position;
receive a determination of a second position for the at least one object;
generate a track plan for a track for transporting the at least one object from the first position to the second position; and
transmit an instruction message to at least one robot, the instruction message instructing the at least one robot to build a track according to the track plan.

* * * * *